July 18, 1961  R. CLEMENT ET AL  2,992,929
CERAMIC DIELECTRIC SUBSTANCES OF HIGH DIELECTRIC
CONSTANT AND LOW TEMPERATURE COEFFICIENT
Filed Jan. 21, 1958  4 Sheets-Sheet 1

RENÉ CLEMENT and
BERNARD TRISTAN

BY Cushman, Darby & Cushman
ATTORNEYS

RENÉ CLEMENT and
BERNARD TRISTAN

RENÉ CLEMENT and
BERNARD TRISTAN

United States Patent Office 2,992,929
Patented July 18, 1961

2,992,929
CERAMIC DIELECTRIC SUBSTANCES OF HIGH DIELECTRIC CONSTANT AND LOW TEMPERATURE COEFFICIENT
René Clement and Bernard Tristan, Paris, France, assignors to Compagnie Generale de Telegraphie Sans Fil, a corporation of France
Filed Jan. 21, 1958, Ser. No. 710,289
Claims priority, application France Jan. 31, 1957
7 Claims. (Cl. 106—39)

The present invention relates to electrical ceramic substances having a high permittivity which remains practically constant with the temperature varying within comparatively wide limits.

It is well known that ceramics formed essentially of barium titanates present dielectric constants of high values, with comparatively low losses. The use of these substances as dielectrics for capacitor manufacturing is, however, restricted, on account of the fact that their Curie point (or magnetic transition point) is located at about 120° C. and that, in the vicinity of this point, the dielectric constant increases very sharply. Therefore, such a material cannot be used where a good stability of the dielectric constant in terms of temperature is required.

In order to prevent a sharp increase of the dielectric constant in the vicinity of the Curie point, and thus obtain as flat a dielectric constant-to-temperature characteristic as possible, various compositions and various manufacturing methods have been proposed.

For instance, under certain conditions, the increase of the constant occurring at the Curie point can be limited by adding to the barium titanate small quantities of magnesium titanate, calcium titanate, iron and calcium oxides, alkaline-earth fluorides, alkaline niobates or tantalates of calcium.

Other known processes enable the same results to be obtained: for instance, by mixing together predetermined quantities of titanates, whose respective Curie points occur at different temperatures and subjecting the resulting product to firing at a temperature sufficiently low for preventing any reaction between the various constituents, a material is obtained displaying at its Curie point, only a slight anomaly in $\epsilon$ values. However, the constant $\epsilon$ of such material is comparatively low.

All the substances obtained with the compositions and manufacturing methods as described hereinabove have a common characteristic: they are all essentially heterogeneous compounds, containing various crystallites of different chemical or crystallographic nature.

In certain known compounds, it is possible to observe the presence of a cubic perovskite-crystal phase, with a Curie point located above the ambient temperature and of a tetragonal barium-titanate phase, whose Curie point is at 120° C. The mixture of these two phases yields a dielectric substance showing two moderate peaks in the $\epsilon$ curve, located at about 10° C. and about 120° C., respectively.

With other known compositions, two coexisting phases of different chemical nature and having different electrical properties can be observed.

All these known heterogeneous materials present several disadvantages, their dielectric constant is generally lower than 1000 and shows variations which, for certain applications, are still too large and occur within too narrow temperature ranges (generally 25 to 85° C.).

The main drawback of such materials is that, due to their heterogeneous nature, their electrical properties are sharply affected by slight changes in all variables in manufacture, which results in a poor reproducibility. The raw materials, the preparation of the mixture (crushing, shaping etc.) and the firing temperature, must be rigorously controlled, since the least variation in one of these technological factors leads to one or the other of these phases being predominant and modifies the electrical properties of the final product. The manufacturing of such products is therefore extremely difficult and the reject rate very high. In addition, the firing temperature of these materials is generally comparatively high (1300° C. and higher) calling for the use of expensive kilns and requiring a high thermal power consumption.

It is an object of the present invention to provide compositions for dielectric ceramics, free of the disadvantages mentioned hereinabove.

Another object of the invention is to provide a process for manufacturing ceramics of this type.

The composition according to the invention comprises essentially barium titanates and a compound or a mixture of compounds represented by the general chemical formula:

$$n(A_xBi_yB_2O_9)$$

Where A indicates one or several of the following chemical elements:
Bi, Ba, Sr, Ca, Pb, Na, K, Cd B corresponds to
Ti, Nb, Ta or a plurality of these elements; $n$ is an integer; the sum of the whole or mixed numbers $x$ and $y$ is equal to 3; said compound or compounds being of a weight corresponding to 0.5–50% of the total weight of the mixture.

According to a particular embodiment of the invention, the component $$n(A_xBi_yB_2O_9)$$

has the following formula, $u$ being comprised between 0 and 2:

$$CdBi_2Nb_uTa_{(2-u)}O_9$$

Among the known components having the above mentioned general formula, the following may be quoted:

$Bi_3Nb_1TiO_9$, $CaBi_2Nb_2O_9$, $SrBi_2Nb_2O_9$,
$BaBi_2Nb_2O_9$, $PbBi_2Nb_2O_9$, $KBi_5Nb_4O_{18}$,
$NaBi_5Nb_4O_{18}$, $CdBi_2Nb_2O_9$

According to the manufacturing method of the invention, suitable quantities of the starting materials are separately fired for producing, respectively, barium titanate and the selected compound $n(A_xBi_yB_2O_9)$. The latter compound is then mixed with the barium titanate, in the proportions mentioned above and, after having been shaped with a suitable binder, according to conventional practice, the mixture is subjected to a thermal treatment, at a temperature in the range of 1,100° C. to 1,300° C.

The invention will be better understood from the following non limitative examples and from the appended drawings, wherein.

Figure 4:
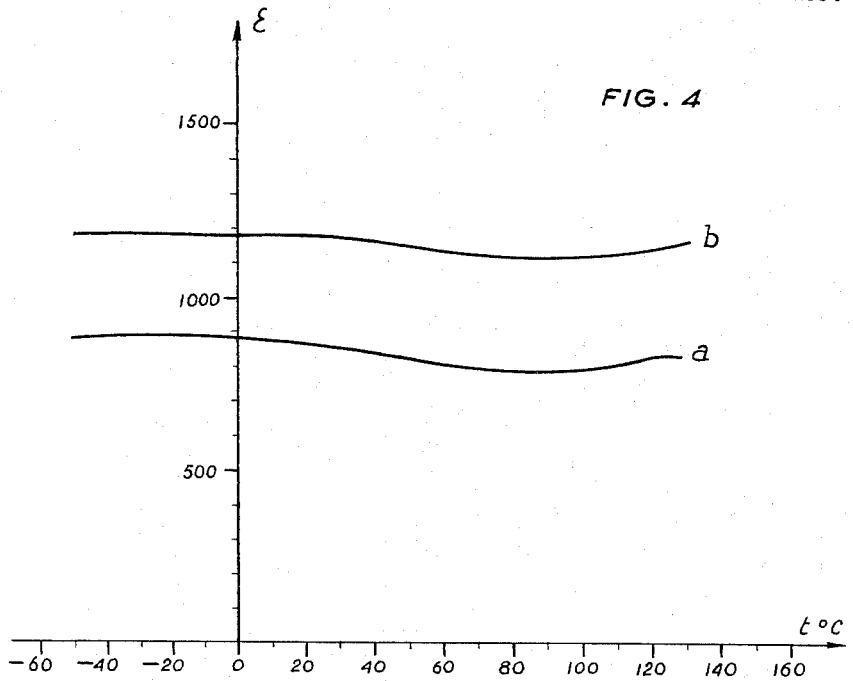
Figure 5:
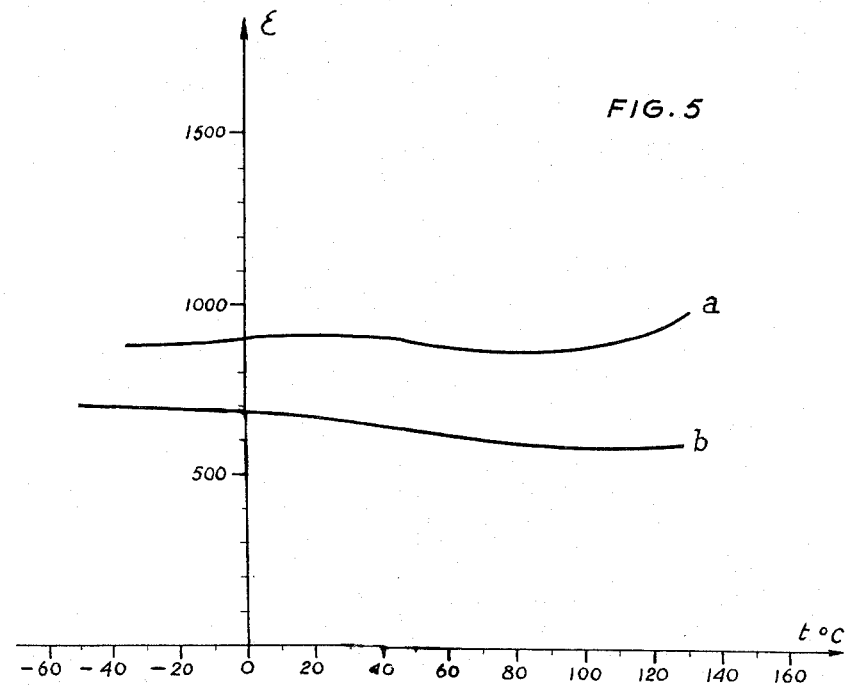

Graph (a)—90 g. of $BaTiO_9$+10 g. of $CaBi_2Nb_2O_9$
Graph (b)—85 g. of $BaTiO_9$+15 g. of $CaBi_2Nb_2O_9$
Graph (c)—80 g. of $BaTiO_9$+20 g. of $CaBi_2Nb_2O_9$ FIG. 4 shows graphs of the variations of the dielectric constant $\epsilon$ as a function of the temperature $t$ for barium titanate ceramics containing various percentages of $SrBiNb_2O_9$;

FIG. 5 illustrates similar curves $\epsilon = f(t)$ for ceramics consisting of BaTiO$_3$ and various percentages of

Figure 6:
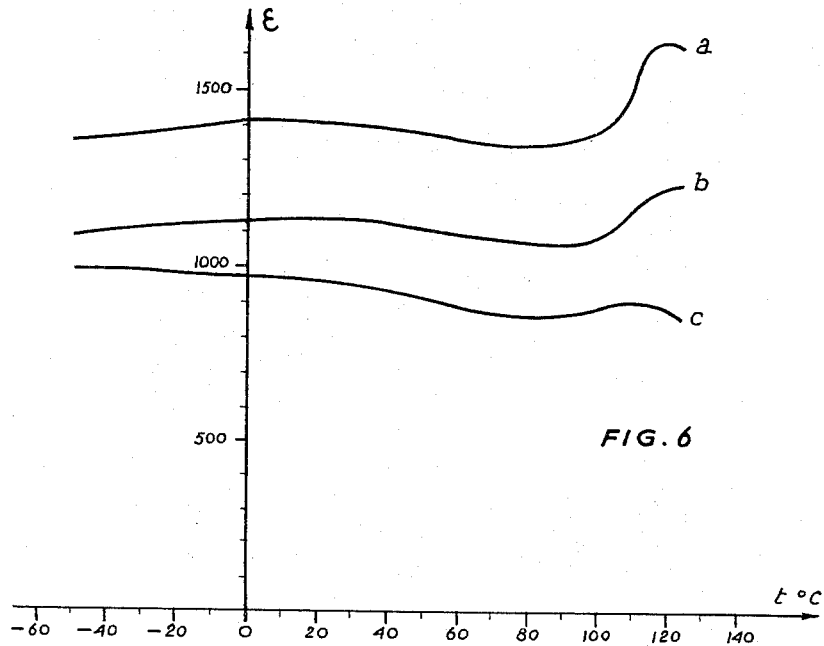

FIG. 6 illustrates same curves $\epsilon = f(t)$ for ceramic dielectrics consisting of BaTiO$_3$ and various percentages of

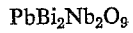

Figure 7:
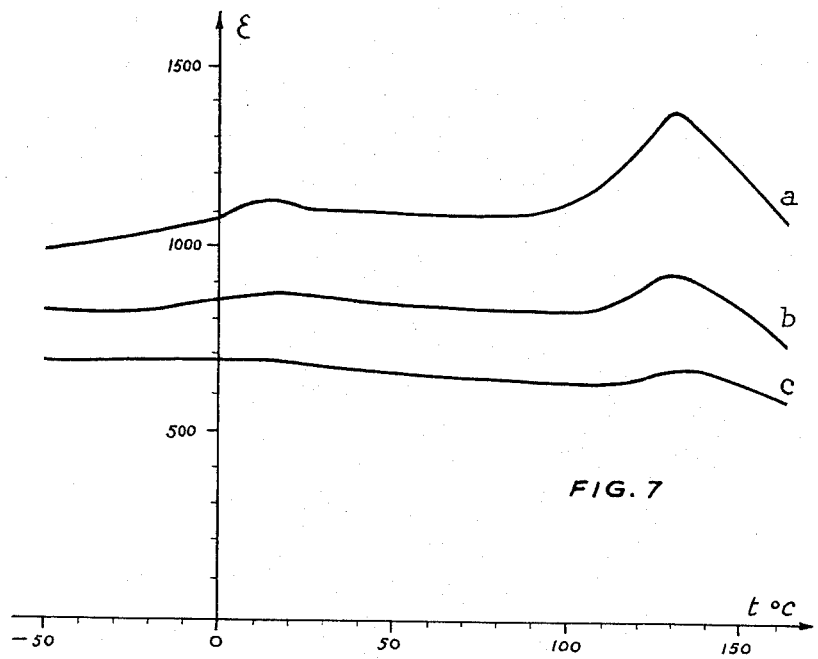

FIG. 7 shows curves (a), (b), and (c) illustrating the variations of the dielectric constant $\epsilon$ as a function of the temperature $t$ (°C.), for barium titanate ceramics containing varying percentages of CdBi$_2$Nb$_2$O$_9$.

*Example 1*

Barium titanate is prepared by firing, at a temperature of 1260° C., a very homogeneous mixture of titanium oxide and of barium carbonate in equimolecular proportions, the resulting product being carefully crushed.

Bismuth oxide, niobium oxide and titanium oxide are fired at a temperature of 1000° C., in the following molecular proportions:

the finished product is finely crushed.

A powder is then prepared by mixing 85 g. of barium titanate with 15 g. of titano-niobate of bismuth, obtained as indicated hereinbefore. An organic binder, which will be eliminated during firing, is then added to the powder, the shaping taking place by molding, extrusion or other known methods.

The samples obtained are subjected to a thermal treatment at a temperature of 1200° C., during approximately one hour. It will be appreciated that the temperature range suitable for firing is very broad, but it is more economical to subject the various pieces to as low a temperature as possible, for instance a temperature of 1200° C., while seeing to it that the resulting material is sufficiently baked, impervious and presenting a vitreous aspect when broken.

Figure 2:
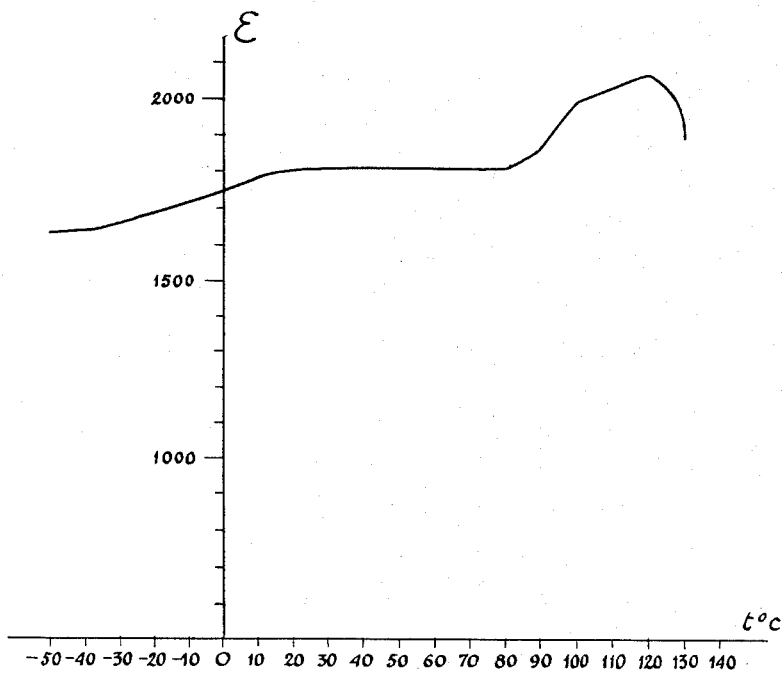
FIG. 2 is a graph showing the variations of the dielectric constant $\epsilon$ as a function of the temperature $t$ (in degrees C.), for a barium titanate ceramic comprising 15% of $Bi_3NbTiO_9$.

As shown by the graph of FIG. 2, the dielectric constant of the resulting product is 1000 at 30° and varies by less than +0.8% between 10° C. and 80° C.

The loss tangent measured at 1 kc. is lower than $100.10^{-4}$.

*Example 2*

One part of calcium carbonate in molecular proportions CO$_3$Ca, one part of bismuth oxide Bi$_2$O$_3$ and one part of niobium oxide Nb$_2$O$_5$ are intimately mixed and fired at a temperature of 1000° C., during about one hour.

Ten grams of the resulting product are added to 90 grams of barium titanate obtained by the method described in Example 1.

Upon being suitably shaped the mixture is baked at a temperature of 1200° C. during about one hour.

The product obtained has substantially the same aspect as that in the first example.

Figure 3:
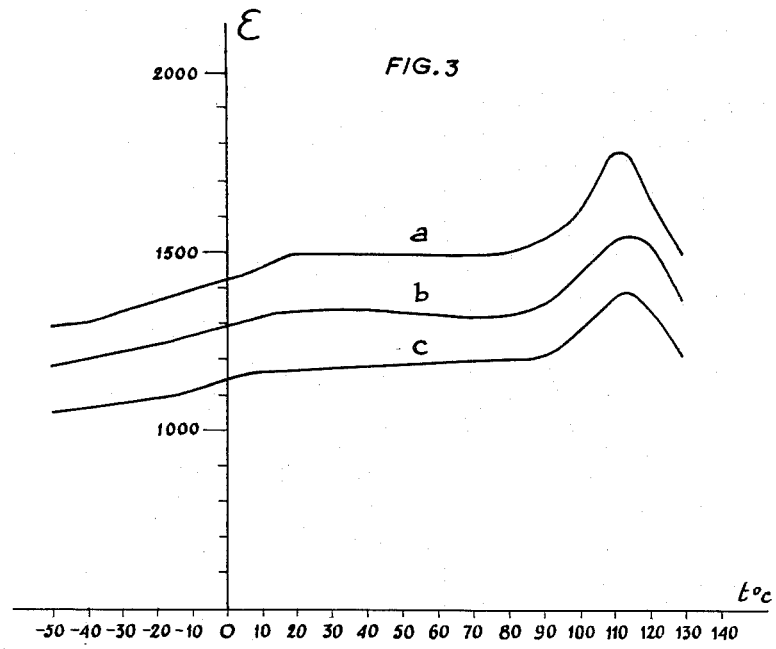
FIG. 3 shows graphs of the variations of the dielectric constant $\epsilon$ as a function of the temperature $t$, for barium titanate ceramics containing different percentages of $CaBi_2Nb_2O_9$, namely—

Graph (a) in FIG. 3 shows the variations of the dielectric constant $\epsilon$ as a function of the temperature: $\epsilon$ is seen to be equal to 1.500 at 25° C. and varies only by +2% between 25° C. and 85° C., and by 10% between —50° C. and 1100° C.

The loss tangent is lower than $100.10^{-1}$, at 1 kc. and 30° C.

The substances comprising 15% and 20%, of

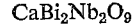

show electrical properties as indicated by the respective graphs (b) and (c) in FIG. 2.

*Example 3*

Compounds of BaTiO$_3$—SrBi$_2$Nb$_2$O$_9$ are prepared as described in Examples 1 and 2, the firing of the compound SrBi$_2$Nb$_2$O$_9$ taking place at 1000° C. during one hour.

The variation diagrams of the electric constant in terms of temperature are shown in FIG. 4;

Graph (a): 90 g. of BaTiO$_3$+10 g. SrBi$_2$Nb$_2$O$_9$
Graph (b): 85 g. of BaTiO$_3$+15 g. SrBi$_2$Nb$_2$O$_9$ It is apparent from graph (a) that $\epsilon$ varies by +5%, about a mean value of 845 between —50° and +130° C.; tg $\delta$ is at 1 kc. equal to: $50.10^{-1}$.

Graph (b) shows that $\epsilon$ varies only by +3% between —50° and 150° C.

The mean value of $\epsilon$ is 1170 and of tg $\delta$, at 1 kc/s. and 20° C., is equal to $80.10^{-1}$.

*Example 4*

Compounds of BaTiO$_3$ and BaBi$_2$Nb$_2$O$_9$ are prepared as in the previous examples, the firing of BaBi$_2$Nb$_2$O$_9$ being performed at 1000° C., during one hour.

FIG. 5 shows the variations, as a function of temperature, of the dielectric constant of the resulting product:

Graph (a): 90 g. BaTiO$_3$+10 g. BaBi$_2$Nb$_2$O$_9$
Graph (b): 80 g. BaTiO$_3$+20 g. BaBi$_2$Nb$_2$O$_9$ Graph (a): mean value of $\epsilon$:900; $\epsilon$ varies by ±5% between —50° C. and +120° C. Tg $\delta$ at 1 kc./s.: $90.10^{-1}$ Graph (b): mean value of $\epsilon$:650; $\epsilon$ varies by ±7% between —50° C. and 130° C. Value of tg $\delta$ at 1 kc./s.: $50.10^{-1}$.

*Example 5*

Compounds BaTiO$_3$—PbBi$_2$Nb$_2$O$_9$ are prepared as in previous examples the baking of PbBi$_2$Nb$_2$O$_9$ taking place at 900° C., during one hour.

FIG. 6 shows the variations as a function of the temperature, of the dielectric constant of the product obtained:

Graph (a): 90 g. BaTiO$_3$+10 g. PbBi$_2$Nb$_2$O$_9$
Graph (b): 85 g. BaTiO$_3$+15 g. PbBi$_2$Nb$_2$O$_9$
Graph (c): 80 g. BaTiO$_3$+20 g. PbBi$_2$Nb$_2$O$_9$ Graph (c): mean value of $\epsilon$: 1380; $\epsilon$ varies by ±4.5% between —60 and +110° C. Tg $\delta$ at 1 kc./s.: $90.10^{-1}$.

Graph (b): mean value of $\epsilon$:1100; $\epsilon$ varies by +4.1% between —60 and +120° C. Tg $\delta$ at 1 kc./s.: $60.10^{-1}$.

Graph (c): mean value of $\epsilon$:920; $\epsilon$ varies by +7.5% between —60 and +120° C. Tg $\delta$ at 1 kc./s.: $40.10^{-1}$.

*Example 6*

The method of preparation of the product is the same as before. The compositions and the electrical properties of the final product are shown in the following table:

| Compositions | | Dielectric constant $\epsilon$ at 20° C. and 1 kc./s. | Variations of $\epsilon$ between —40° C. and +100° C., percent | Tg $\delta.10^{-4}$ at 20° C. and 1 kc./s. |
| --- | --- | --- | --- | --- |
| BaTiO$_3$, Percent by weight | CdBi$_2$Nb$_2$O$_9$, Percent by weight | | | |
| 90 | 10 | 1,130 | ±5 | 90 |
| 85 | 15 | 900 | ±3.5 | 66 |
| 80 | 20 | 710 | ±4.4 | 29 |

The substances according to the invention, and more particularly those described in the above examples, have been reproduced a plurality of times, with various batches of raw materials and different methods of preparation, without any variation in the electric properties of the final products having been noticed.

It has also been observed that small variations in the molecular proportions of the components may be allowed without much modifying the properties of the final product.

These remarkable properties may be explained by considering the molecular structure of the components, the general formula of which is $n(A_xBi_yB_2O_9)$, wherein A and B are metals as defined hereinabove.

It will be noted that the metallic ions A have an ion radius of between 0.98 and 1.43 A. and the B ions a radius of about 0.65 A.

Figure 1:
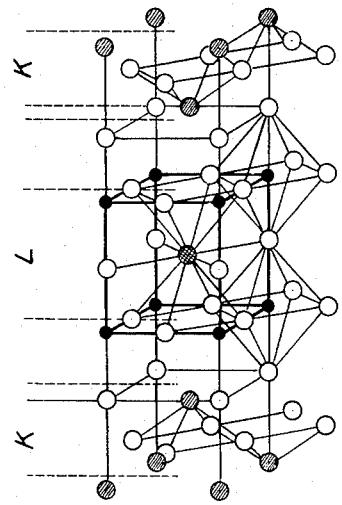
FIG. 1 illustrates the crystalline structure of the $n(A_xBi_yB_2O_9)$ compounds.

FIG. 1, where white circles represent oxygen atoms, hatched circles ions Bi, black circles ions B and circle containing a checked hachure one or several ions Bi or B, shows the regular alternation of groups K of the type $(Bi_2O_2)^{++}$, with groups L of the perovskite type. The structure of these latter groups depends upon the selected component $n(A_xBi_yB_2O_9)$. Thus, in the component $CaBi_2Nb_2O_9$, they are formed by groups such as $(CaNb_2O_7)^{--}$. In the compound $Bi_5Nb_4O_{18}$, a group $(Bi_2O_2)^{--}$ alternates with a group $(Bi_3Nb_2O_7)^{++}$.

Since such structures include groups of the perovskite type, it will be appreciated that these compounds are capable of yielding solid solutions with barium titanate, which possesses itself a crystalline structure of the perovskite type.

Thus, the heterogeneous nature of mixtures of these compounds with barium titanate is at a molecular scale, and not at the macroscopic scale of the crystallites as in the known compounds, thus enabling the drawbacks mentioned above to be avoided.

It is to be understood that the various examples given above are not limitative.

What we claim is:

1. A dielectric ceramic composition consisting essentially of 80 to 99.5% of barium titanate and 0.5 to 20% of at least one compound selected from the group consisting of $Bi_3NbTiO_9$, $BaBi_2Nb_2O_9$, $NaBi_5Nb_4O_{18}$, $CaBi_2Nb_2O_9$, $PbBi_2Nb_2O_9$, $CdBi_2Nb_2O_9$, $SrBi_2Nb_2O_9$ and $KBi_5Nb_4O_{18}$.

2. A dielectric ceramic composition consisting essentially of 80 to 99.5% by weight of barium titanate and 20 to 0.5% of the compound of $CdBi_2Nb_2O_9$.

3. A dielectric ceramic composition consisting essentially of 80 to 99.5% by weight of barium titanate and 20 to 0.5% of the compound $Bi_3NbTiO_9$.

4. A dielectric ceramic composition consisting essentially of 80 to 99.5% by weight of barium titanate and 20 to 0.5% of the compound $CaBi_2Nb_2O_9$.

5. A dielectric ceramic composition consisting essentially of 80 to 99.5% by weight of barium titanate and 20 to 0.5% of the compound $SrBi_2Nb_2O_9$.

6. A dielectric ceramic composition consisting essentially of 80 to 99.5% by weight of barium titanate and 20 to 0.5% of the compound $BaBi_2Nb_2O_9$.

7. A dielectric ceramic composition consisting essentially of 80 to 99.5% by weight of barium titanate and 20 to 0.5% of the compound $PbBi_2Nb_2O_9$.

References Cited in the file of this patent

UNITED STATES PATENTS

| | | |
|---|---|---|
| 2,646,359 | Wainer | July 21, 1953 |
| 2,805,165 | Goodman | Sept. 3, 1957 |
| 2,908,579 | Nelson | Oct. 13, 1959 |

FOREIGN PATENTS

| | | |
|---|---|---|
| 755,860 | Great Britain | Aug. 29, 1956 |
| 487,961 | Great Britain | June 29, 1938 |
| 574,577 | Great Britain | Jan. 11, 1946 |

OTHER REFERENCES

Wainer et al.: "Niobate and Tantalate Dielectrics," Journal of the American Ceramic Society, vol. 35, No. 8, Aug. 1, 1952 (pages 207–14).